United States Patent
Behrens et al.

(10) Patent No.: US 7,519,688 B2
(45) Date of Patent: Apr. 14, 2009

(54) BROWSER ENABLED WIRELESS COMMUNICATION SYSTEM HAVING ENCODED PARAMETERS FOR TRANSMISSION

(75) Inventors: Ralph Behrens, Schellerten (DE); Kuz Volker, Braunschweig (DE); Jan Koeppen, Karlsbad (DE); Dirk Lappe, Hohenwettersbach (DE)

(73) Assignee: Harman Becker Automotive Systems GmbH (DE)

( * ) Notice: Subject to any disclaimer, the term of this patent is extended or adjusted under 35 U.S.C. 154(b) by 511 days.

(21) Appl. No.: 10/497,422

(22) Filed: May 28, 2004

(65) Prior Publication Data

US 2005/0091377 A1 Apr. 28, 2005
US 2006/0106932 A9 May 18, 2006

Related U.S. Application Data

(63) Continuation-in-part of application No. PCT/EP02/13609, filed on Dec. 2, 2002.

(30) Foreign Application Priority Data

Nov. 30, 2001 (DE) ................. 101 58 739

(51) Int. Cl.
*G06F 15/16* (2006.01)
(52) U.S. Cl. .............. 709/219; 709/227; 709/230; 709/237
(58) Field of Classification Search ............. 709/217, 709/219, 230, 237, 227
See application file for complete search history.

(56) References Cited

U.S. PATENT DOCUMENTS 6,202,023 B1* 3/2001 Hancock et al. ............. 701/201

(Continued)

FOREIGN PATENT DOCUMENTS

DE 100 08 454 A1 7/2001

(Continued)

OTHER PUBLICATIONS

"Wirellss Application Protocol Client ID Specification" Wireless Application Protocol Forum, Apr. 2001, WAP-196-ClientID.*

(Continued)

*Primary Examiner*—Jeffrey Pwu
*Assistant Examiner*—David Ampagoomian
(74) *Attorney, Agent, or Firm*—Brinks Hofer Gilson & Lione

(57) ABSTRACT

A wireless communication system allows mobile users to access a resource from a content server. The wireless communication system includes a browser that allows mobile users to access resources through a wireless application protocol (WAP) compliant server. The (WAP) compliant server connects the browser to a content server. This connection allows resources to be passed between the browser and the (WAP) compliant server. The browser is further configured to transmit a request that includes an address for a resource, a protocol to be used, and one or more textual parameters encoded into a binary data packet. The wireless communication method includes generating a request for a resource; translating a textual portion of that request into binary data at the browser; transmitting the request to a wireless gateway; and converting the request into a format that is compatible with a protocol used by a receiving network.

16 Claims, 3 Drawing Sheets

U.S. PATENT DOCUMENTS

| | | | |
|---|---|---|---|
| 6,253,326 B1 | 6/2001 | Lincke et al. | |
| 6,658,011 B1 * | 12/2003 | Sevanto et al. | 370/401 |
| 6,771,651 B1 * | 8/2004 | Beshai et al. | 370/401 |
| 7,039,037 B2 * | 5/2006 | Wang et al. | 370/349 |

FOREIGN PATENT DOCUMENTS

| | | |
|---|---|---|
| EP | 1 449 346 B1 | 12/2002 |
| GB | 2 361 560 A | 10/2001 |
| JP | 2001 045022 A | 2/2001 |
| WO | WO 01/19102 A1 | 3/2001 |
| WO | WO 01/37507 | 5/2001 |
| WO | WO 01/75629 A1 | 10/2001 |
| WO | WO 01/84804 A2 | 11/2001 |

OTHER PUBLICATIONS

"End-to-end Performance Implications of Slow Links" Dawkins,S. Montenegro, G. Kojo,M. Magret,V. Mar. 2000, Internet Engineering Task Force, RFC 3150 Version 03.*

"Wireless Datagram Protocol" Maccari,A. May 5, 2000Research Seminar on WAP, University of Helsinki, Deparmetn of Computer Science.*

"Beyond Hypertext: Using the WWW for Interactive Applications" Gleeson, M. Westaway,T. Jul. 3, 2001. Internet Archives Wayback Machine. http://web.archive.org/web/20010703034837/http://ausweb.scu.edu.au/aw95/hypertext/gleeson/index.html.*

Wietfeld, et al., "Das Wireless Application Protocol," Elektronik Wireless, Mar. 2001, S. 36-41.

Harman/Becker: Automotive Systems GmbH (Hrsg.): Markteinführung von Online Pro, Funkschau, Aug. 2001, Heft 18.

Seeger, Jürgen: Fast Alles Standard. iX, Heise Verlag Hannover, 1996, Heft 1, S. 142-145.

International Search Report for Application No. PCT/EP02/13609, dated Dec. 8, 2003, 6 pages.

"Coding of Moving Pictures and Associated Audio", published by International Organization For Standardization Organization International Normalization—ISO/IEC JTC1/SC29/WG11, dated Feb. 1998, No. N1987, XP-002259500, pp. 1-4.

"TCP/IP Tutorial and Technical Overview", published by IBM, dated Aug. 2001, XP-002244571, pp. 514-518 and 751-752.

Yamato Satoshi, "To The Horizon of Network Game Continued User Management In CGI", OHIX, No. 1999 Spring, pp. 220-223, Softbank Publishing Co., Ltd., May 14, 1999, CSDB: Domestic Technical Magazine 200000365024) (4 pages).

Notice of Final Rejection, Japanese App. No. 2003-548492, dated Nov. 14, 2007, including English Translation.

* cited by examiner

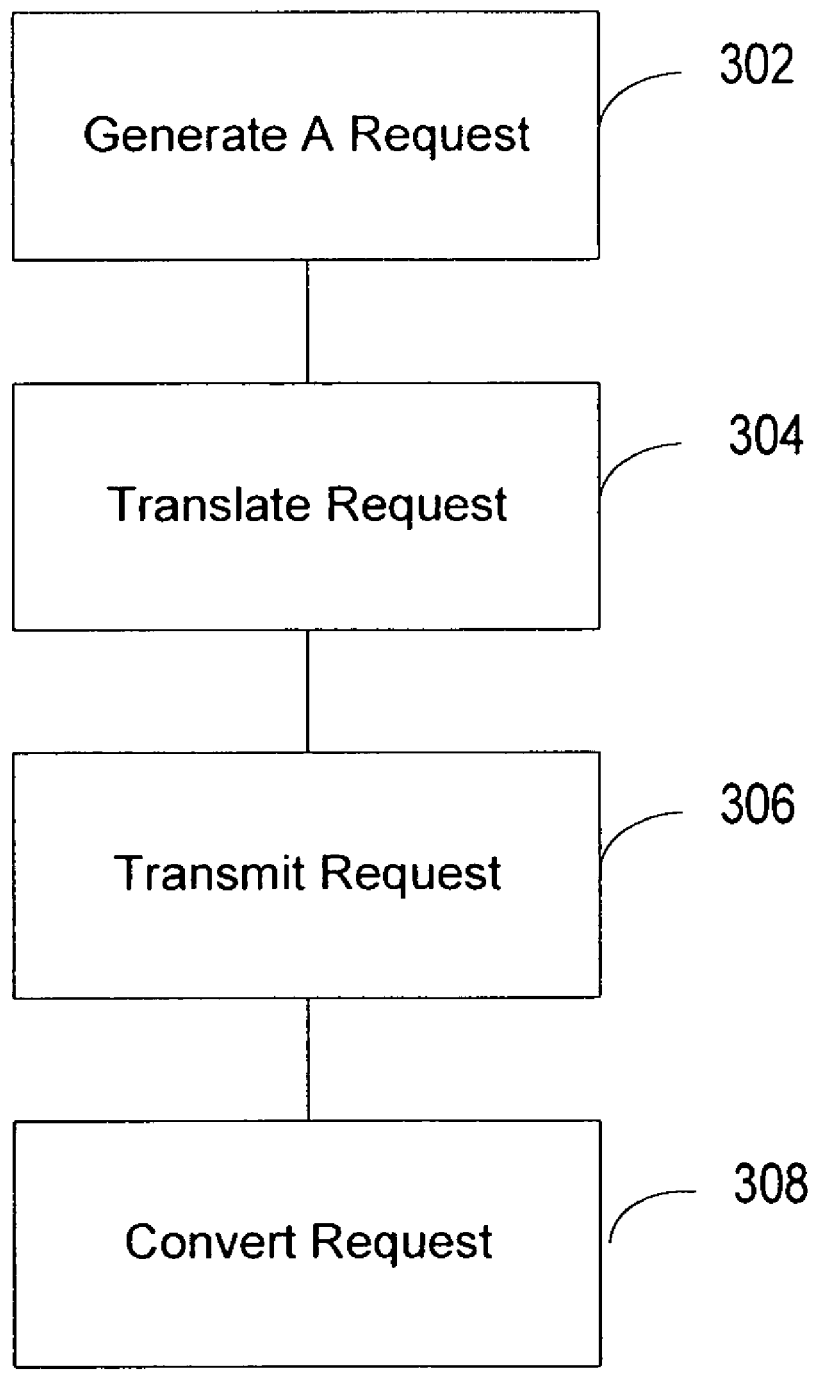

BROWSER ENABLED WIRELESS COMMUNICATION SYSTEM HAVING ENCODED PARAMETERS FOR TRANSMISSION

This application is a continuation-in-part and claims the benefit of priority under 35 U.S.C. §§ 120, 365, and 371 to Patent Cooperation Treaty Patent Application No. PCT/EP02/13609, filed on Dec. 2, 2002, which was published in German under Publication No. WO 03/047201. This application further claims the benefit of priority to German Application No. DE 10158739.2, filed Nov. 30, 2001. The disclosures of the above applications are incorporated herein by reference.

BACKGROUND OF THE INVENTION

1. Technical Field

The invention relates to an exchange of information, and more particularly, to a mobile communication system.

2. Related Art

Wireless Application Protocol (WAP) enables delivery of information and services to mobile users. Both high end and low end devices including handheld wireless phones and pagers may rely on a WAP communication protocol to connect to the Internet. WAP may be based on Internet standards such as Hypertext Markup Language (HTML) and Extensible Markup Language (XML) that use tags to organize and present information.

To access information, software allows users to view Wireless Markup Language (WML) documents and access files related to those documents. WML primarily transports text because tags related to large resources such as large tables and images may slow down the communication exchange. A WAP compliant browser may also interpret some Wireless Markup Language Script (WMLScript) to create customized responses to requesting clients.

A request, such as a Uniform Resource Locator (URL), may ask for resources through the Internet. In a simple format string, a URL request may specify the protocol to be used, the server to be accessed, the path to the resource, and multiple parameters that may be related to the resource. At a high level, the URL is simply a formatted string such as ". . ./testappl.cgi?navdest=[1]DEUTSCHLAND,, [2]HILDESHEI M,, [3]DAIML RRING" where the parameters are positioned after the equal sign (e.g., ". . . /testappl2.php?param1=somevalue&param2=anothervalue . . . "). As more parameters are used, the processing time to service a request increases, which may slow down the information exchange. When retransmissions are required, the congestion caused by the transmission of an identical second request may create further delays, which may eventually overload an Internet connection.

Therefore, a need exists for a system that overcomes some of these potential drawbacks in the related art.

SUMMARY

This invention provides a wireless communication system that allows mobile users to access a resource from a content server. The wireless communication system includes a browser that allows mobile users to access resources through a wireless application protocol (WAP) compliant server. The (WAP) compliant server couples the browser to a content server. This connection allows resources to be passed between the browser and the (WAP) compliant server. The browser is further configured to transmit a request that includes an address for a resource, a protocol to be used, and one or more textual parameters encoded into a binary data packet.

The wireless communication method comprises generating a request for the resource; translating a textual portion of that request into binary data at the client; transmitting the request to a wireless gateway; and converting the request into a format that is compatible with a protocol used by a receiving network.

Other systems, methods, features, and advantages of the invention will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 is a flow diagram of a communication protocol.

DETAILED DESCRIPTION OF THE PREFERRED EMBODIMENTS

An improved communication protocol embodiment provides an effective way to control congestion on a wireless system. The communication protocol may adjust the transmission rate of all requests by controlling the size of the data stream or packets used to locate and access resources. The communication protocol may verify the integrity of the data stream by determining whether any errors have been introduced into the data stream during transmission.

Figure 1:
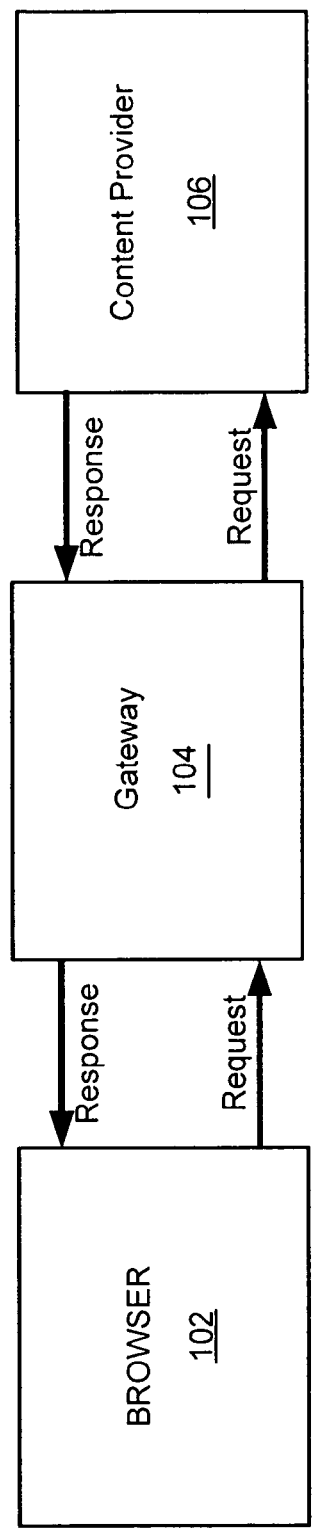
FIG. 1 is a partial block diagram of a wireless communication system.

FIG. 1 is a partial block diagram of a wireless communication system 100. The wireless communication system 100 includes software that allows mobile users to view resources, access files, and access software related to those resources through a network such as the Internet, a Wide Area Network (WAN), and a Virtual Private Network (VPN). The software may be resident to or accessed by a mobile client. The mobile client may request information through a connecting device that may connect one or more networks using many different communication protocols. The connecting device allows information to be passed from one device to another by both transferring information and converting it to a form that is compatible with protocols used by receiving device.

In FIG. 1, a mobile client may request information through strings that may identify a resource by its type, its location, and in some instances, its address, and/or a path to its address. The mobile client may comprise a hand-held wireless device such as a mobile phone, a pager, a personal digital assistant, a two way radio, a computer, a camera or an in-vehicle systems such as a navigation system, a radio, or any other vehicular devices that may send or receive data or phone calls. In FIG. 1, the mobile client comprises a wireless internet browser 102 that may be compliant with a Wireless Application Protocol (WAP) or WAP architecture. The wireless internet browser 102 may be capable of downloading and transferring information, which may include text, audio files, and programs. The wireless internet browser 102 may request resources through strings that include a single parameter that contains only binary coded information. When multiple parameters are requested, the parameters may be consolidated or encoded into a single value, and a text-to-binary translation may occur before the request containing the single value is sent to a wireless internet gateway 104. In some embodiments, the wireless internet browser 102 may be compliant with WAP and other protocols that enable users to access on-line groups, display graphics, play video files, or access other resources or objects on a publicly accessible network like the Internet.

A wireless internet gateway server 104 may receive requests for resources and/or services and convert or translate the requests to forms that are compatible with a content provider 106. When a wireless internet browser uses the same communication protocol used by a content provider 106, the wireless internet gateway server 104 may act as a bridge that simply connects the wireless internet browser 102 to the content provider 106.

The wireless internet gateway server 104 may include a device or program that converts the coded binary data back to its original form (e.g., a decoder) before converting or translating it to a form that is compatible with protocols used by the content provider 106. When necessary, the wireless internet gateway 104 may also interpret data fragmentation and may reunite parts of the data stream or data packets that have become fragmented by the wireless web browser 102 or the content provider 106. When the data transmission protocol transports fragmentized data, a defragger resident to the wireless internet gateway 104 may interpret the data transmission protocol and reunite those parts of the data stream that were broken apart or have become detached.

In FIG. 1, an orgin server or mirror server 106 provides the content requested by the wireless internet browser 106. Content in this sense may include information, such as text audio, listings of web sites, dynamic and static resources, and product specific materials. When the wireless internet browser 102 is compliant with WAP and other protocols, the content may include any other data type including video and graphics.

When a response is received from the content provider 106, the wireless internet gateway 104 may parse the response and convert or translate the information contained in the response to a form that is compatible with the wireless internet browser 102. In some embodiments, the information received by the wireless internet browser 102 will adhere to the protocol that the wireless internet browser 102 used to transmit requests. In these embodiments, the data stream or data packets may include encoded binary packets that may be converted back to its original form by a decoder resident to the wireless internet browser 102.

In FIG. 1, the wireless internet browser 102 may be configured to receive an extension of a Simple Mail Transfer Protocol. This protocol may permits data, such as text, sound, and binary files to be received by the wireless internet browser 102 without having to be translated into an ASCII format. The receiving application or software that is resident to the wireless internet browser 102 may be Multipurpose Internet Mail Extension (MIME) compliant, while other embodiments may also be Secure/Multipurpose Internet Mail Extension compliant. In some embodiments, the wireless internet browser 102 may refer to a standardized list of documents that are organized into MIME types and subtypes to interpret the content received from the content provider 106 or wireless internet gateway 104. For instance, one MIME type is text, and it may have a number of subtypes, including plain text and Hypertext Markup Language (HTML). A MIME type of text/html may refer to a file that contains text written in HTML.

The communication protocol embodiment may transmit large data streams and automatically transmit large data packets. The embodiments support a normal client/server model where a user enters a request, such as a Uniform Resource Indicator (URI) or a Uniform Resource Locator (URL), that is sent to a server, and the server answers by sending a response. In contrast, some communication protocol embodiments also support push technology. In a push technology, a host or server may request data from a client. A push operation may be accomplished by allowing an initiator, which may comprise a content provider 106, to push content and delivery instructions to the wireless internet gateway 104 or a push gateway. The wireless internet gateway 104 or push gateway may then deliver the content and its related data to the wireless internet browser 102 according to the delivery instructions. If a connection cannot be made with the wireless internet browser 102, the wireless internet gateway 104 or push gateway may store the content until a connection with the wireless internet browser 104 may be made. The data transmitted with the content may indicate how long data may be retained within the gateways and/or the browser.

In some communication protocol embodiments, internal task identification codes may also be delivered with the data. In these embodiments, internal task identification codes may provide information about the outcome of a task, such the delivery of a request, the delivery of a resource, the cancellation of a message, the outcome of a handshake, or the outcome of other tasks that are to be carried out by a browser, a gateway, a server, or other devices.

Figure 2:
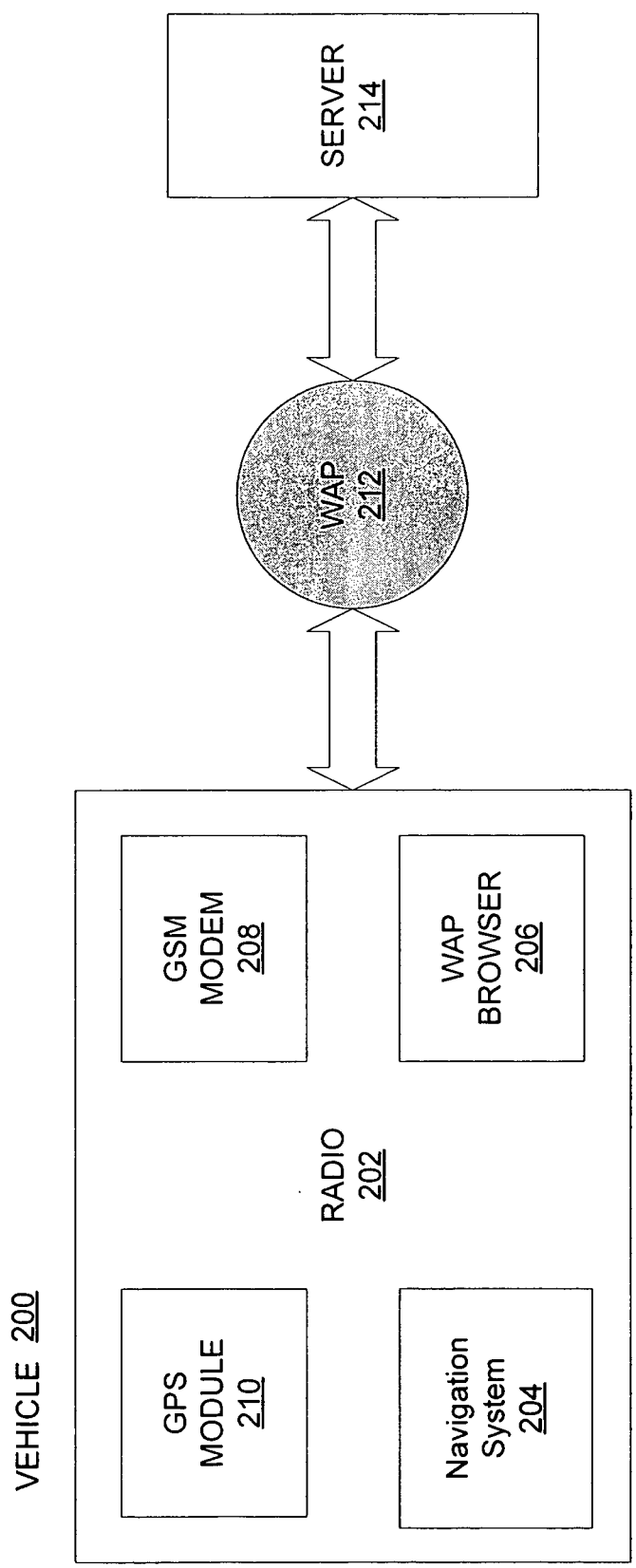
FIG. 2 is a second partial block diagram of a wireless communication system within a vehicle.

FIG. 2 is a partial block diagram of a vehicle 200 that may use a communication protocol embodiment. A vehicle component or device such as a radio 202 may include a browser 206, a navigation system 204 such as the satellite navigation system (that may include a global positioning module 210), and optionally, a transceiver that may both transmit and receive signals. In FIG. 2, the transceiver may be part of a Global System for Mobile Communications (GSM) 208 that may further comprise a built-in modem.

Using a WAP protocol, the vehicle 200 may communicate with an origin server or mirror server 214. In FIG. 2, the origin server or mirror server 214 may push information to the client through a Short Message Service, (SMS) and the client may pull information from the server through a request that includes a text-to-binary conversion.

In operation, a user may access the satellite navigation system by pressing keys on the panel of the radio 202. A user may enter any parameter such as a chosen city, a road name, a house address or select one of the many destinations that may be pre-programmed in the radio memory. Selections may include selecting amenities such as points of interests, hotels, gasoline stations near projected fuel stops, and route selections (e.g., the fastest, shortest, most use of interstates routes).

Once the data is entered through the data interface it may be stored in a volatile or non-volatile memory under a user profile. The data interface may comprise a graphical user interface (GUI), a command line interface, or a textual input. Once received, the satellite navigation system 204 initiates a data connection through the GSM modem 208, which may be built into or may be separate from the radio 202. As the connection is made, the navigation system 204 may select or access the user's profile.

Once connected, a requested Internet portal may be accessed through a WAP service provider 212 and all possible services may be displayed on a WML (Wireless Markup Language) page. The Internet portal call or request may pass one or many parameters, such as a device number, a password, vehicle identification number (VIN), and geographical (geo) coordinates through a URI or URL parameters.

A responding server may assemble a WAP page with stored or dynamically generated information that may be customized to a particular user. In some embodiments, a user may navigate through the contents like a conventional browser. If a user selects a hotel search, the traveling area may be analyzed on a server side automatically. Depending on the vehicle's 200 position that may be transmitted to the server 214 when a user logs in, the server may select possible hotels from a database. These results may then be sent back to a display or terminal coupled to the radio in the form of a WML page.

A user may select a desired hotel and receive detailed data or information on the hotel. The information may be relayed through a WML page that includes a data link. In some embodiments, the data link may conceal a data packet, which includes a destination description that may used by the navigation system.

In the navigation system 204 shown in FIG. 2, turn-based directions may be displayed on the radio's display with audio or voice prompts that prompt the user when and where to turn. The audio or voice prompts may be convey through the vehicles radio system. In FIG. 2, the connection to the server may be continuously sustained or automatically terminated after navigation data has been received or transmitted.

FIG. 3 shows a flow diagram of a communication protocol. At act 302, a client generates a request for a resource on a publicly distributed or privately distributed network. The request may comprise a string of characters that include a single or multiple parameters. At act 304, a translation such as a text-to-binary translation may occur at the client that consolidates the parameters to a single binary packet. In some embodiments, the client may be compliant with WAP and other protocols that enable users to access text, audio, on-line groups, graphics, video files, or access other resources or objects available on the network. At act 306 the request is transmitted to a gateway that may convert or translate the request to one or more forms that are compatible with a content provider at act 308. The content provider may comprise a content providing server at act.

The following structures may be used to implement the communication systems described above.

1. Format of the Data Packets

A format of the data packets exchanged between the client and server is described below. In addition to the MIME type protocol, the following sections describe the format of the data packets that are sent from the server to the client (Service packets) and those sent from the client to the server (Request packets).

1.1 Content/MIME Type

The Content type or MIME type selected for some of the described embodiments may be called, for example, x-becker/vnd.wap.lbs. The MIME type begins with "x-", to fulfill Advanced Network Architecture Group's (ANA's) requirements (see www.w3c.org-RFC 1700). This format used to transmit data from a server to the client is extensible, and may be modified or changed to work with later developed languages because different services can be handled through a separate Service ID with this MIME type. In some communication systems, only data packets that have this MIME type may be decoded by the client, according to an included Service ID.

1.2 Service Packet (Server)

The Service packets may be transmitted from the server portal to the client when requested. In addition to the Service ID code, device numbers and procedures to check for errors in data transmissions may be executed. A cyclical redundancy check such as a CRC32 may be checked to ensure that the service packets contain useful data. The length of the useful data may depend on the service a user selects, which makes this format flexible.

1.21 Format of the Data Packet

The packets may follow an MPEG2 syntax. The protocol setup, for example, may be structured as follows:

```
service_packet ( )
{
    Service_id              8 bits      // Service identification code
    device_id_length        8 bits      // Length of the serial number
    for (n1=0; n1< device_id_length; n1++)
    {
        device_id[n1]       8 bits      // Serial number
    }
    reserved                32 bits     // for future use
    last_section_number     4 bits      // Number of packets
    section_number          4 bits      // Number of this packet
    for (n1=0; n1< session_id_length; n1++)
    {
        session_id[n1]      8 bits      // Session ID
    }
    switch (Service_id)
    {
    case SERVICE_NAVDESTINATIONS:
        service_packet_navdestinations ( )
        break
    case SERVICE_SERVERREQUEST:
        service_packet_serverrequest ( )
        break
    case SERVICE_TTS:
        service_packet_tts ( )
        break
    case SERVICE_...:
        service_packet_... ( )
        break
    }
    CRC_32                  32 bits     // automatic error correction
}
```

| Parameter | Value | Description |
|---|---|---|
| SERVICE_NOTDEFINED | 0x00 | Safety anchor . . . |
| SERVICE_NAVDESTINATIONS | 0x01 | Poll the destinations defined over WWIN |
| SERVICE_TTS | 0x02 | Text-to-Speech |
| SERVICE_SERVERREQUEST | 0xF0 | Position request from server |

The device id contains the device number. It may also be called the user name in some parts of the source code. The two 4-bit values last_section_number and section_number describe the number of types of packets that are transmitted, such as in a sequence one after another, and by packet number. This is useful for future versions of communication protocols in which the data volume exceeds a normal capacity. In one embodiment, these two values can always be set to 1.

To transmit more than one section, the session_id is needed. The session_id may be included in the transmission of each data exchange. It has a variable length and is generated/stipulated by the server the first time the server is called. By using this ID, the server may determine which client is making a client request. Handshaking processes, such as those needed for TDS, for example, can be realized using a combination of section_number, last_section_number and session_id.

With the exception of the last value, an error checking code (e.g., CRC 32), further decoding takes place depending on the service_id. Encoding of the potentially useful data is treated in the appropriate sections below.

1.2.2 Service.ID SERVICE NAVDESTINATIONS

The search for destinations in the vicinity of a user defined profile that may be associated with the SERVICE_NAVDESTINATIONS ID makes it possible to request navigation data for special destinations (restaurants, hotels, train stations, museums, etc.). In those navigation systems that may use resident memory and CD-ROM to store an entire or a portion of a navigation route, destination information may not be contained in the "normal" CD navigation data.

This additional service provides a type of dynamic reference or yellow pages for the car through the radio. The navigation data that is requested by a user through this process can be billed to the user, just as it may also be billed to the owner of the destination (for example, a restaurant owner).

The format of the data packet may look as follows:

```
service_packet_navdestinations ( )
{
    start_mode        2 bits    // For navigation
    save_mode         1 bit     // Save yes or no
    reserved          5 bits    // For future use
    number_of_dest    8 bits    // Number of destinations in packet
    for (i=0; i<number_of_dest; i++)
    {
        dest_length   8 bits    // Number of characters in string
        for (n1=0; n1<dest_length; n1++)
        {
            destination [n1]    // Chars of the destination
        }
        url_length    8 bits    // Number of characters in string
        for (n1=0; n1<url_length; n1++)
        {
            url [n1]            // URL with destination information
        }
    }
}
```

Additional data, such as one URL per navigation destination, can be attached to a data packet, depending on the definition. If the Service ID SERVICE_NAVDESTINATIONS was found when the header data was decoded, then the data is decoded according to the syntax recorded in the program.

The two values start_mode (2-bit value) and save_mode (1-bit value) may be used in the navigation logic. The start mode may be used to establish whether the navigation process starts up right away or whether the transmitted destinations should first be placed into a local or a remote memory as a possible destination for later use. Possible values for this mode may include:

TABLE

Possible start modes for the navigation

| Value | Term | Description |
| --- | --- | --- |
| 0x0 | NAVISTART_NOT | Do not start navigation |
| 0x1 | NAVISTART_ROUTE | Navigation with route options |
| 0x2 | NAVISTART_IMMIDIA | Start navigation immediately |
| 0x3 | Reserved | Reserved for future use |

Subsequently, the value number_of_dest, (e.g., the number of destinations in this packet), may be established in this block. Then comes a loop which is run through exactly number_of_dest times. By this loop, the individual destinations are read out.

1.2.2.1 Destination String

The Destination string indicates the destination that is being transmitted. The string is made up of tags, the selection criteria, followed by the respective description. The selection criteria are in square brackets and contain a number (decimal). The string may look like:

[1]DEUTSCHLAND,,[2]HAMBURG,,[3]WENDEN-STRASSE,,[256]Innovative Systems

[1]DEUTSCHLAND,,[124]0 0

[1]DEUTSCHLAND,,[124]0–73450,,[256]    McDonalds Ecuador

Likewise, there is the possibility of specifying a destination in WGS84 format. WGS-84 coordinates may have an inaccuracy of 50 meters (10 meters Nav-Tech data +20 meters inaccuracy of the GPS data in each direction) for destination guidance.

1.2.3 Service-ID SERVICE SERVERREQUEST

This service makes it possible for the server to query the current position of a device making the request. This information may be used for Location Based Services.

Current geo data may be transported to the server when a user logs onto the car radio or wireless web browser. The current geo data is, however, preferably supplied when the client's request are sent to the server through data packets or a data stream.

If the server wants position data at some future time, then the server may issue a request when needed. This functionality may be important to fleet management, placing an emergency call, return call actions, etc.

```
service_packet_serverrequest ( )
{
    length_of_url                       8 bits  // Length of URL
    for (n1=0; n1<length_of_url; n1++)
    {
        response_url[n1]                        // URL for the answer
    }
}
```

The client may need the URI or URL to which it should reply for the answer to the server's request. This is specified in this location. First, the length of the URL length_of_url is specified as an 8-bit value, and then comes the actual character string.

1.3 Request Packet (Client)

In the same way as the server reply, a more binary oriented format may be followed in client requests for data. The format of the data packet is described in more detail as follows:

In contrast to the service packet, the binary packet cannot simply be transmitted (push transmission), but must instead be attached to the request to the URI or URL, because of browser restrictions. This requires that the data be converted into a URI or URL-specific notation. In this embodiment, the length of the URI or URL should not exceed a total of 256 characters to remain compatible with older gateways that may cut off data that exceeds those limits.

By transmitting a Session ID in the packets being passed back and forth, it is not always necessary that an ongoing session be ended by a URI or URL call. For example, at the applicant's online portal, one may log in, for example, at the beginning of a session with the user's name and the user's password. Once logged in, the user is in a session in which the data is transmitted in an encoded form. As soon as an attempt is made to call a link with a self-generated URL not from the client, one starts a new session, as long as the server does not recognize that it is the same session based on the Session ID.

1.3.1 Format of the Data Packet

The format of the data packet is as follows: The Session ID can either be attached to the URL as a separate parameter or integrated into the data request packet. In the first case, the length of the Session ID is set to 0. An example of a Session ID set to 0 may be:

```
request_packet
{
    task_name                24 bits    // Task identification (old)
    service_id               8 bits     // Identification of the service
    device_id_length         8 bits     // Length of the serial number
    for (n1=0; n1< device_id_length; n1++)
    {
        device_id[n1]        8 bits     // Serial number
    }
    fin_length               8 bits     // Length of the vehicle identification number
    for (n1=0; n1< fin_length; n1++)
    {
        fin[n1]              8 bits     // Vehicle identification number
    }
    software_version_length  8 bits     // Length of the version identification
    for (n1=0; n1< software_version_length; n1++)
    {
        software_version [n1] 8 bits    // Version identification
    }
    language_id              8 bits     // Language selection on the client
    reserved                 32 bits    // for future use
    password_length          8 bits     // Length of the password
    for (n2=0; n2<password_length; n2++)
    {
        password[n2]         8 bits     // Chars in the password
    }
    for (n3=0; n3<session_id_length; n3++)
    {
        session_id[n3]       8 bits     // Chars in the Session ID
    }
    longitude                32 bits    // Longitude
    latitude                 32 bits    // Latitude
    if (Service_id == SERVICE_NAVDESTINATIONS)
    {                                   // No additional data is
                                        // requested here
    }
    else if (Service_id == SERVICE_....) // This can look different
    {                                    // for other requests
        ...
    }
    CRC_32                   32 bits    // Error correction
```

The tag task_name may still be contained in this format, to make the transmission from the old to the new easier. The actual request is in the service id tag. This is where the Service_ID that the receiver wants to use is specified, or consequently requested. If additional data is needed for individual requests, they may be to be implemented in the lower part of the packet.

The device_id is the client's device number, the same as in the server reply. It may comprise about 14 characters. The six values that may follow it may describe the current position of the vehicle in X and Y coordinates.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A communication system having a browser capability, comprising:

a wireless application protocol (WAP) compliant server; and a client communicating with the WAP compliant server utilizing a WAP protocol and adapted to transmit to the WAP compliant server a uniform resource locator (URL) request having attached parameters for requesting an offered service, where upon transmission, the attached parameters comprise a binary data packet encoded for transmission and the binary data packet comprises:

a service identification code for identifying a requested service;

a device identification length and a device identifier for identifying a serial number of the client;

a vehicle identification number for identifying a vehicle associated with the client;

a password for logging in the requested service; and additional data required for the requested service, the additional data varying based on the requested service;

where the server responds to the URL request by sending a response data packet, the response data packet comprising successive bits arranged one after another as follows:

the service identification code (Service ID) for identifying the requested service;

the length of the device identifier of the client;

the device identifier of the client;

bits further reserved for future applications;

a number of data packets transmitted by the WAP compliant server; and a packet number of each data packet within the number of data packets transmitted by the WAP compliant server; and a session identification code for further identifying a session and having a variable length where the session identification code is generated and determined by the WAP compliant server upon first request.

2. The communication system according to claim 1 where the attached parameters are converted into a notation specific to the URL request based on browser restrictions.

3. The communication system according to claim 1 where the URL request is not more than 256 characters long.

4. The communication system according to claim 1 where the attached parameters comprise a session identification code for a handshake process with the WAP complaint server and the WAP compliant server identifies the client making the URL request based on the session identification code.

5. The communication system according to claim 1 where the WAP compliant server performs a push transmission of another binary data packet in response to the URL request from the client.

6. The communication system according to claim 5 where the offered service comprises querying the client's current position and the WAP compliant server pushes a query of the client's current position and sends data based on the position passed on after a log-in by a user.

7. The communication system according to claim 1 where the data packets from the WAP compliant server comprises a one data format.

8. The communication system according to claim 1 where the service identification code has a specified bit length and the WAP compliant server decodes remaining data contained in the data packets based on the service identification code.

9. The communication system according to claim 1 where the offered service comprises searching a destination in the client's vicinity and in response to the URL request, the client receives navigation data corresponding to the destination in the client's vicinity once a search is complete.

10. The communication system according to claim 1 where the client comprises a navigation system resident to a vehicle radio or a vehicle navigation system.

11. The communication system according to claim 1 where the client comprises an Internet compliant hand-held wireless device.

12. The communication system according to claim 1, where the client comprises a terminal or part of the terminal within a vehicle's communication system.

13. The communication system according to claim 1, where the WAP compliant server transmits to the client the data packets in a Multipurpose Internet Mail Extension (MIME) format.

14. The communication system according to claim 1 where the services identification code has a predetermined bit length.

15. A method for use with a communication system having browser capability and comprising a WAP compliant server and a client communicating with a WAP protocol, comprising:

receiving from the client a URL request having attached parameters for requesting an offered service where the attached parameters comprise a binary data packet encoded for transmission and the binary data packet comprises:

a service identification code (service-ID) for identifying a requested service;

a device identification length and a device identifier for identifying a serial number of the client a vehicle identification number for identifying a vehicle associated with the client;

a password for logging in the requested service;

a session identification code (session-ID) for identifying a session; and additional data required for the requested service, the additional data varying based on the requested service;

enabling a handshake procedure based on the session-ID and identifying the client making the URL request, thereby beginning the session with the identified client;

recognizing the service-ID and decoding remaining data in the URL request based on the service-ID;

forming at the WAP compliant server a response data packet that comprise:

the service identification code (Service ID) for identifying the requested service;

the length of the device identifier of the client;

the device identifier of the client;

bits further reserved for future applications;

a number of data packets transmitted by the WAP compliant server;

a packet number of each data packet within the number of data packets transmitted by the WAP compliant server; and the session identification code for further identifying the session and having a variable length where the session identification code is generated and determined by the WAP compliant server upon first request; and where forming the response data packet at WAP compliant server comprises arranging successive bits one after another in the above order; and transmitting the response data packets to the client.

16. The method according to claim 15, further comprising:

transmitting to the client the response data packets in a Multipurpose Internet Mail Extension (MIME) format

* * * * *